July 17, 1962 Z. BLOCK ET AL 3,044,180
METHOD OF TREATING COMESTIBLES
Original Filed Sept. 24, 1957 7 Sheets-Sheet 1

INVENTORS
ZENAS BLOCK
HERBERT T. HUNTER
BY WILLIAM S. HODGES

William R. Lieberman
ATTORNEY

July 17, 1962 Z. BLOCK ET AL 3,044,180
METHOD OF TREATING COMESTIBLES
Original Filed Sept. 24, 1957 7 Sheets-Sheet 6

INVENTORS
ZENAS BLOCK
HERBERT T. HUNTER
BY WILLIAM S. HODGES
William R. Liberman
ATTORNEY July 17, 1962   Z. BLOCK ET AL   3,044,180
METHOD OF TREATING COMESTIBLES
Original Filed Sept. 24, 1957   7 Sheets-Sheet 7

United States Patent Office 3,044,180
Patented July 17, 1962

3,044,180
METHOD OF TREATING COMESTIBLES
Zenas Block, Larchmont, N.Y., and Herbert T. Hunter and William S. Hodges, Catonsville, Md., assignors to DCA Food Industries Inc., New York, N.Y., a corporation of New York
Original application Sept. 24, 1957, Ser. No. 685,983. Divided and this application July 24, 1958, Ser. No. 750,752
7 Claims. (Cl. 34—20)

The present invention relates generally to an improved method and apparatus for the manufacture of comestibles, and it relates more particularly to an improved method and apparatus for the manufacture of baked products, such as fried cakes and the like.

In the manufacture of baked products, such as fried cakes, the palatability, appearance and shelf life under various packaging conditions of the end product are of primary importance. It has been found that the optimum conditions for handling and treating the fried cakes immediately upon or shortly after their removal from the frier or cooker depend upon the nature of the fried cake as well as upon the surrounding atmospheric conditions. This is particularly true where a rapid cooling of the fried cakes is to be effected. Thus, it has been found that the optimum conditions for the post cooking or frying or other treatment of plain doughnuts, of glazed yeast raised doughnuts and of Bismark doughnuts are considerably different. Improper treatment and cooling of the freshly fried cakes results in an inferior product in respect to their palatability, appearance and shelf life.

It is thus a principal object of the present invention to provide an improved apparatus and method for the production of comestibles.

Another object of the present invention is to provide an improved method and apparatus for the manufacture of baked products, such as fried cakes and the like.

Still another object of the present invention is to provide an improved method and apparatus for the treatment of warm, freshly prepared fried cakes.

A further object of the present invention is to provide an improved method and apparatus for the treatment of warm, freshly prepared fried cakes to place them in optimum condition for further handling and treatment and packaging.

Still a further object of the present invention is to provide an improved method and apparatus for the rapid cooling of freshly fried cakes to produce a uniform end product of highest quality, and in optimum condition for further handling and packaging.

Another object of the present invention is to provide an improved method for treating freshly glazed fried cakes.

The above and other objects of the present invention will become apparent from a reading of the following description, taken in conjunction with the accompanying drawings, wherein

FIGURE 3 is a front diagrammatic view of the conveyor drive and gear system;

Figure 1:
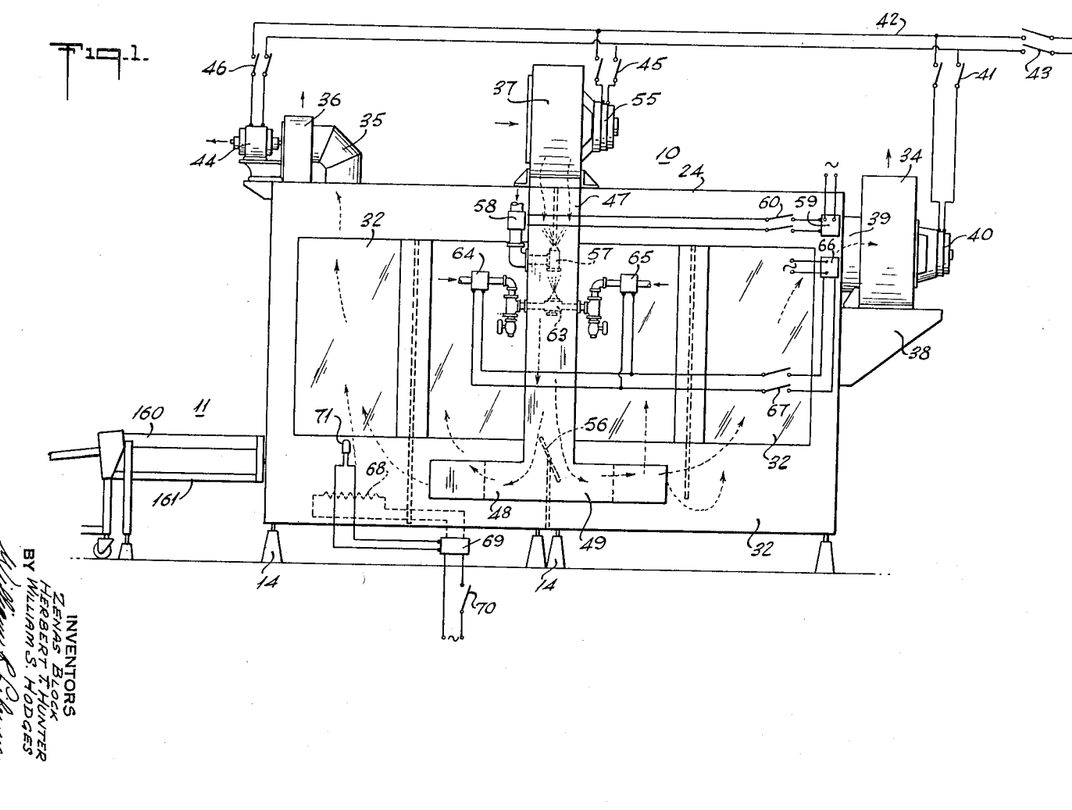
FIGURE 1 is a front elevational view of a preferred embodiment of the present invention shown partially diagrammatically.
Figure 5:
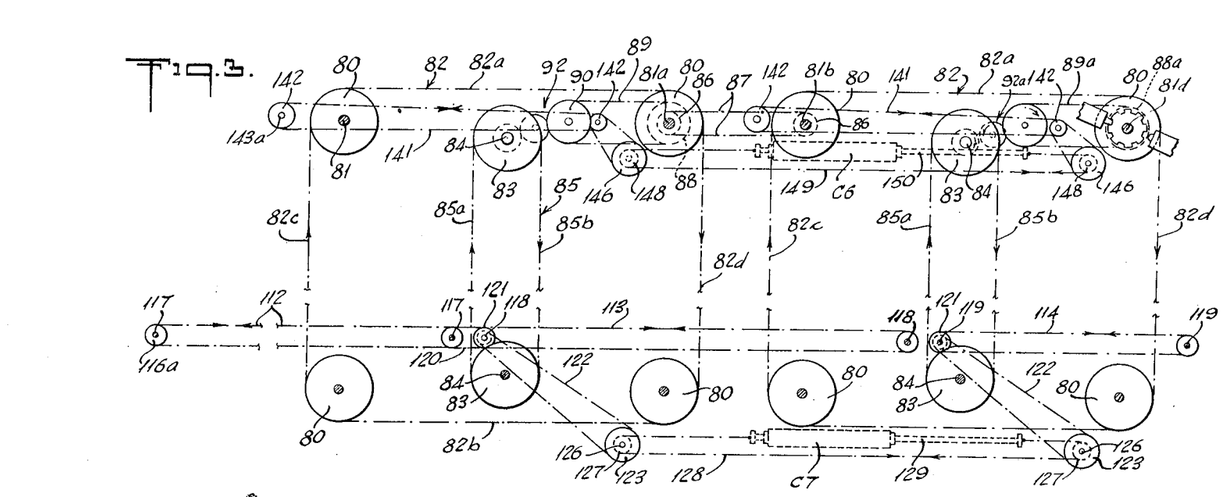
FIGURE 5 is a vertical, longitudinal, sectional view of the improved apparatus partially broken away for convenience of illustration.
Figure 6:
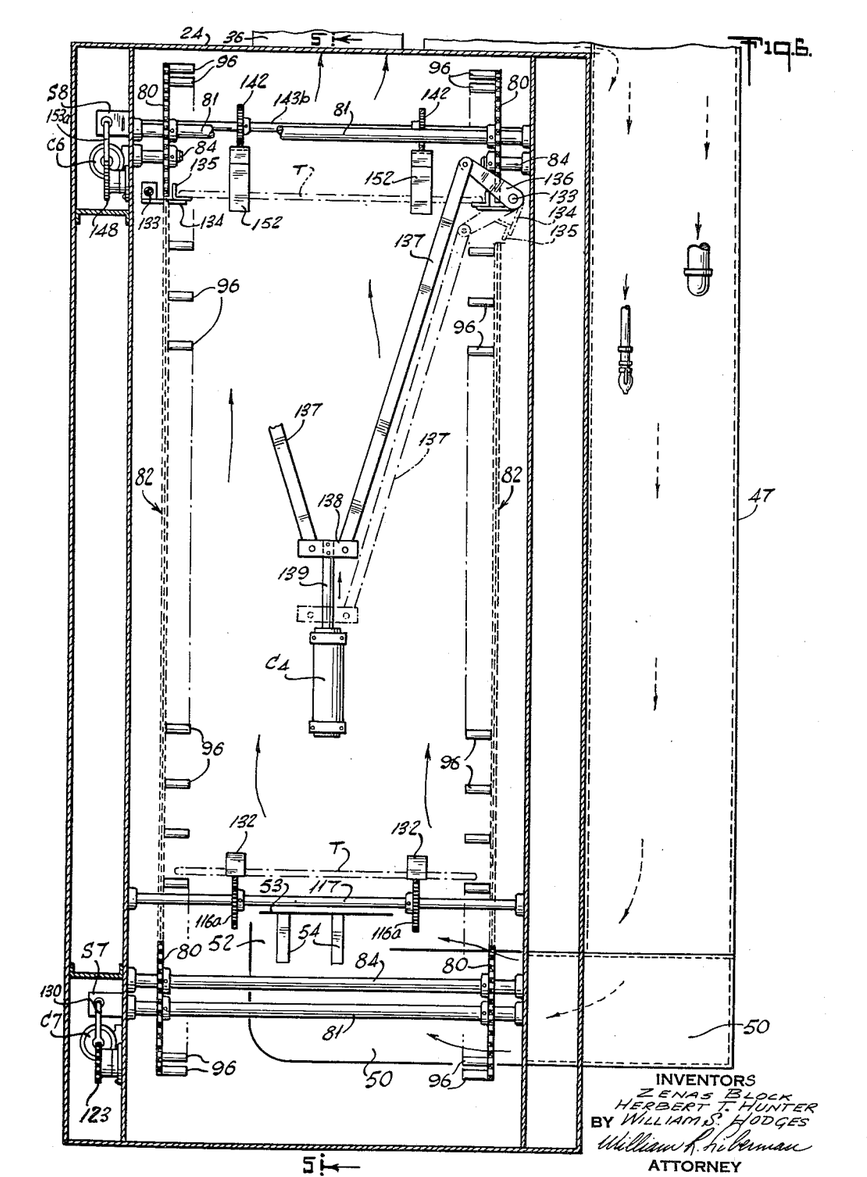
FIGURE 6 is a sectional, enlarged, detailed view taken along line 6—6 in FIGURE 5.

Referring now to the drawings and more particularly to FIGURES 1, 5 and 6 thereof, the numeral 10 generally designates the comestible treating cabinet in accordance with the present invention and the numeral 11 designates the improved tray feeding device. The cabinet 10 is formed of two upright chambers 12 and 13 respectively arranged in end-to-end relationship and supported above floor level by suitable pedestals or upright foot pieces 14.

The sides of the chambers 12 and 13 and the rear face of the chamber 12 and the front face of the chamber 13 are double walled being formed of suitably supported spaced panels, the space between the respective wall panels being sufficient to accommodate various of the operating mechanisms as will be hereinafter set forth. The abutting end walls 16 and 17 of the chambers 12 and 13 respectively have lower and upper registering transverse slots 18 and 19 formed therein to permit the transfer of trays between successive chambers 12 and 13 and the flow of air between the chambers.

The chamber 12 is divided into two similarly shaped compartments 20 and 21 by a vertical panel 22 extending upwardly from the base or floor 23 of the chamber 12 to a point below the roof 24 of the cabinet 10 so as to afford communication between the compartments 20 and 21 along their upper part permitting the transfer of trays from compartment 20 to 21 and the flow of air along the upper part of the chamber 12. Similarly, the chamber 13 is divided into two similarly shaped compartments 26 and 27 by means of a suitably supported vertical partition 28 extending from a point above the floor 29a of the chamber 13 to a point below the roof 24 of the cabinet 10. Thus, communication is afforded between the compartments 26 and 27 along the upper portions thereof to permit the transfer of trays and the passage of circulating air and along the bottom thereof for the passage of circulating air.

A transversely extending slot 29 defining a feed opening is formed in the trailing end wall of the cabinet 10 and is at substantially the level of the transfer opening 18 formed in the abutting end walls of the chambers 12 and 13 and a transverse slot 30 defining a discharge opening is formed in the leading end wall of the chamber 13 and is likewise at the horizontal level of the transverse slot 18. The chambers 12 and 13 are each provided with a pair of window carrying doors 32 having transparent panes to thereby permit visual access to each of the compartments 20, 21, 26 and 27 without opening the doors and also permitting physical access to these compartments. Furthermore, the floor 23 of the chamber 12 in the vicinity of the compartments 20 is perforated as at 33 to permit the ingress into the compartment 20 of atmospheric air.

In order to effect the controlled circulation of conditioned air through the cabinet 10 there are provided a main exhaust fan 34, an auxiliary exhaust fan 36 and a blower 37. The main exhaust fan 34 may be of the conventional centrifugal type and is mounted on a bracket 38 carried on the upper portion of the front wall of the chamber 13. The inlet to the exhaust fan 34 is connected by way of a conduit 39 to the interior of the upper portion of the cabinet 10 so that as reduced pressure is established along the upper part of the cabinet 10 whereby to effect the upward flow of air through the various compartments 20, 21, 26 and 27. The auxiliary exhaust fan 36 is mounted on the roof 24 of the cabinet 10 directly above the first compartment 20 and has its opening connected by way of a conduit 35 to the upper portion of the compartment 20. It should be noted that the auxiliary exhaust fan 36 not only effects the upward flow of air through the compartment 20 but also tends to increase the upward flow of air through the compartment 21.

Figure 2:
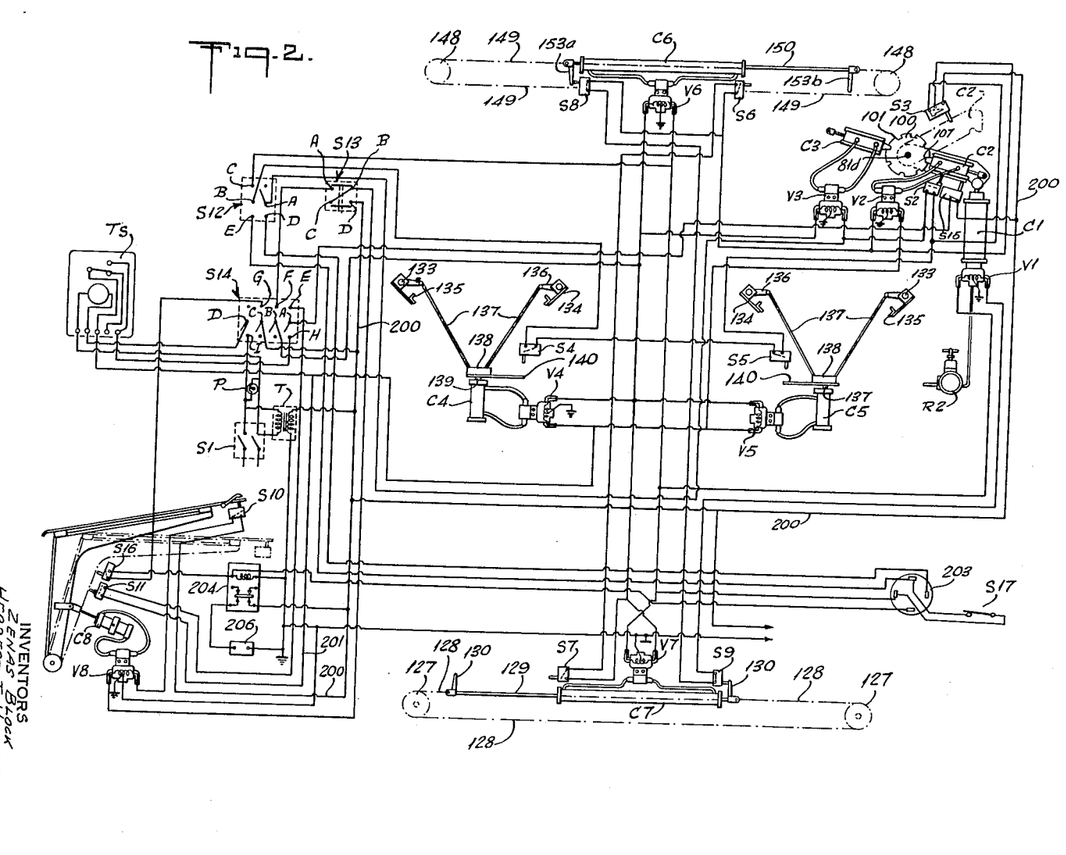
FIGURE 2 is a diagrammatic and schematic view of the circuit network and conveyor motivating system associated with the improved apparatus.

The exhaust fan 34 is driven by a suitable electric motor 40 which is connected by way of a switch 41 to a power line 42 which in turn is connected to a source of current by way of a main switch 43. Similarly, the exhaust fan 36 is driven by a suitable motor 44 which is connected by way of a switch 46 to the power line 42. Both the fans 34 and 36 may exhaust directly into the atmosphere.

The blower 37 is mounted on the roof 24 of the cabinet 10 at the junction of the chambers 12 and 13 and has its outlet connected to a vertical duct 47 extending downwardly and terminating at its lower end in oppositely extending legs 48 and 49 respectively. Transversely extending ducts 50 and 51 communicate with the ends of the duct legs 48 and 49 and enter the cabinet chambers 12 and 13 at the lower regions of the compartments 21 and 26 respectively.

Upwardly directed openings 52 are formed at the termini of the entrant ducts 50 and 51 at about the central portion of the compartments 21 and 26 below the level of the feed and discharge openings 29 and 30. Disposed above each of the openings 52 and below the levels of the tray feed and discharge openings 29 and 30 are plate baffles 53 mounted on upright legs 54 secured to the ducts 50 and 51 respectively.

The exhaust fan 37 is driven by a motor 55 which is connected by way of a switch 45 to the power line 42. It should be noted that the capacity of the exhaust fan 34 and the blower 37 are approximately the same and that when all the fans are operating air is blown by the fan 37 through the ducts 47, 48, 49, 50 and 51 into the compartments 21 and 26 and through the bottom opening in the panel 28 into the compartment 27 from which compartments the air is withdrawn along the upper portion of the cabinet 10 by the fan 34 and exhausted to the atmosphere.

In the compartment 20 the air flows upwardly from the atmosphere through the openings 33 therein and the major portion thereof is exhausted by the exhaust fan 36 into the atmosphere. When the exhaust fan 36 is deenergized the flow of air through the compartment 20 is at a minimum. A suitably adjusted flap valve 56 is located in the lower portion of the duct 43 in order to permit a variation of the volume of air directed into the separate compartments 21, 26 and 27.

In order to condition the air flowing through the compartments 21, 26 and 27 and to regulate the relative humidity and temperature thereof a steam nozzle 57 having an upwardly directed opening is located in the upper portion of the duct 47 in the direct path of the flow of air therethrough and is connected by way of a solenoid operated valve 58 to a suitable source of steam.

The solenoid of the valve 58 is connected through a wet bulb thermostat 59 and a switch 60 to a source of solenoid energizing current. The wet bulb thermostat 59 is located within the flow of air entering the inlet of the exhaust fan 34 and is of any well known type. The wet bulb thermostat 59 closes a switch upon the wet bulb temperature falling below a preadjusted level to connect the solenoid of the valve 58 to the energizing current and thereby effect an opening of the steam valve 58 and the injection of steam by way of the nozzle 57 into the air flowing through the duct 47. When the wet bulb temperature is above the preset level the thermostat switch 59 opens, deenergizing the solenoid of the valve 58 thereby closing the valve and cutting off the supply of steam to the nozzle 57. In the event that it is not desired to inject steam into the air flow the switch 60 may be opened.

Also located in the upper portion of the duct 47 is an upwardly directed atomizing nozzle 63 of any well known type connected to a source of compressed air by way of a solenoid operated valve 64 and to a source of water under pressure by way of a solenoid valve 65. The actuating solenoids of the valves 64 and 65 are connected in parallel and through a dry bulb thermostat 66 and a normally closed switch 67 to a source of solenoid energizing current. The thermostat 66 is likewise located in the flow of air entering the suction inlet of the exhaust fan 34 and is similar to the thermostat 59, being, however, responsive to the dry bulb temperature of the air and effecting a closing of the thermostat switch when the temperature exceeds a preadjusted level and opening the thermostat switch when the temperature drops below a predetermined level.

Thus, at temperatures below predetermined temperature the solenoids of the valves 64 and 65 are deenergized thereby cutting the injection of a vapor mist into the air flow in the duct 47 when the dry bulb temperature exceeds a predetermined level the thermostatic switch 66 closes to thereby energize the solenoids of the valves 64 and 65 to effect the injection of water vapor into the air flow in the duct 47. By opening the switch 67 the injection of water vapor into the duct 47 is prevented.

In order to increase the temperature of the air flowing through the compartment 20, which condition is often desired, as will be hereinafter set forth, an electric heating element 68 is located in the lower part of the compartment 20 directly above the openings 33 formed in the floor 23. The heating element 68 is connected through a control box 69 and a switch 70 to a source of current. The control box 69, which may be of any well known type, has its control terminals connected to an adjustable thermostat or other heat responsive element 71 which is located at approximately the middle of the compartment 20 directly below the level of the feed opening 29. Thus, the temperature of the air circulating through the compartment 20 may be raised to or regulated at any desired temperature.

In order to transport the loaded trays which are perforated and preferably in the form of grids, through the successive compartments 20, 21, 26 and 27 there are provided a pair of interconnected intermittently driven endless conveyor systems located in the chambers 12 and 13 respectively. Each of the conveying systems, as best seen in FIGURES 3 through 6 of the drawings, includes a pair of laterally spaced endless sprocket chains 82 each having an upper horizontal flight 82a located below the chamber top wall 24 and a lower horizontal flight 82b located a short distance above the chamber floor 23, a trailing vertical flight 82c and a leading vertical flight 82d.

Each of the sprocket chains 82 is carried by a plurality of sprocket wheels 80 located at the corners of the path of the sprocket chains 82, the sprocket wheels 80 being affixed and rotatable with laterally extending suitably supported pairs of upper and lower shafts 81, 81a, 81b, and 81d so as to synchronously rotate. A second pair of laterally spaced endless sprocket chains 85 are disposed within the area of and coplanar with the sprocket chains 82 and include spaced vertical runs 85a and 85b respectively. The sprocket chains 85 are carried by sprocket wheels 83 affixed to and rotatable with transversely extending suitably supported shafts 84. The sprocket chains 82 and 85 are intermittently advanced in a clockwise direction, as seen in FIGURES 2 and 5 of the drawings.

Figure 4:
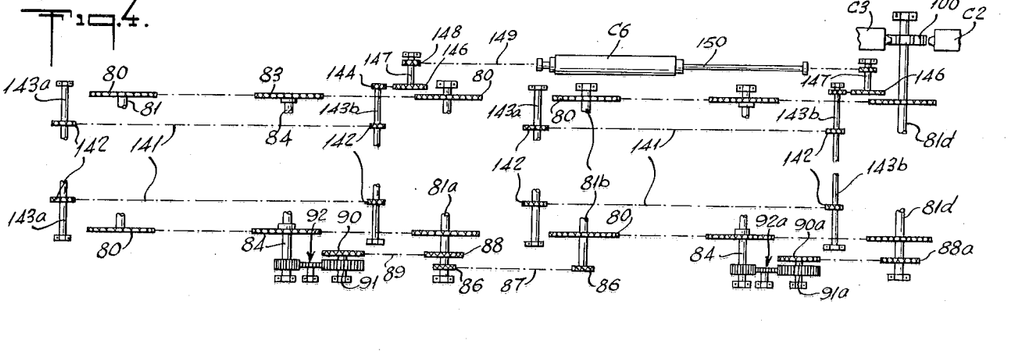
FIGURE 4 is a top plan diagrammatic view of the conveyor drive and gear system.

The mechanism for synchronizing the sprocket chains 82 and 85 throughout the apparatus so that the increments of advance thereof in a vertical direction are identical and at the same time, include sprocket wheels 86 affixed to the upper adjacent shafts 81a and 81b located in the successive chambers 12 and 13 and coupled by a sprocket chain 87. The shaft 81a has affixed thereto a sprocket wheel 88 which is connected by way of a sprocket chain 89 to a sprocket wheel 90 fixed to a stub shaft 91. The stub shaft 91 is connected by way of a gear train 92 to the upper shaft 84 in the cabinet 12 so that the peripheral speeds of the sprocket wheels 80 and 83 are the same. The upper forward shaft 81d in the cabinet 13 carries a sprocket wheel 88a connected by a sprocket chain 89a to a sprocket wheel 90a carried on a stub shaft 91a which is connected by way of a gear train 92a to the upper shaft 84 in the leading cabinet 13. Thus, the sprocket chains 82 and 85 in the cabinets 12 and 13 are synchronously driven.

Located on each of the sprocket chains 82 and 85 are inwardly directed tray supporting elements 96, the spacing of the elements along the chain being equal to the intermittent increment of advance of the sprocket chains as will be hereinafter set forth. The tray supporting elements 96 are arranged on the sprocket chains 82 and 85 so as to lie in vertically spaced horizontal planes so that a tray carried by a set of elements 96 is likewise horizontal. The increments of advance of the chains 82 and 85 as well as the distance between successive elements 96 are such as to permit the location of a loaded tray between successive sets of elements 96 without interference therewith and preferably with a minimum of clearance thereby resulting in a maximum capacity of the apparatus.

Figure 9:
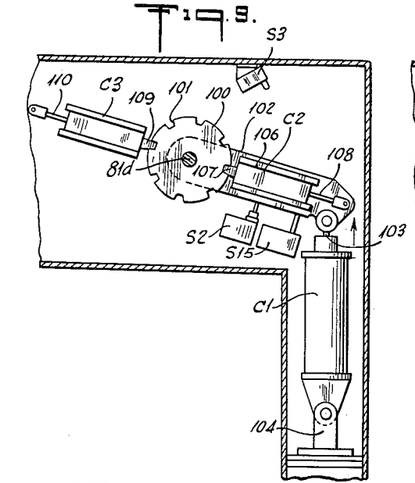
FIGURE 9 is a front elevational, enlarged, detailed view of the conveyor motivating system illustrated in retracted position.
Figure 10:
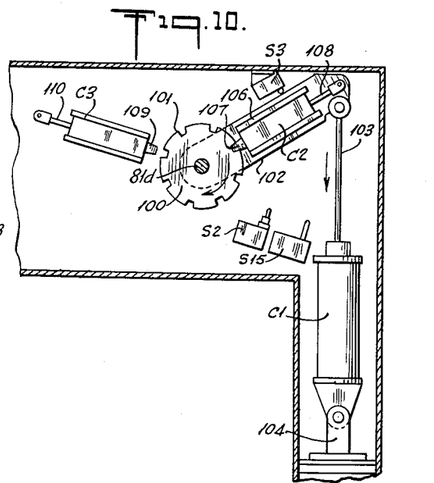
FIGURE 10 is a view similar to FIGURE 9 illustrating the motivating system in advanced position.

In order to intermittently advance the sprocket chains 82 and 85 a predetermined increment there is affixed to the upper leading shaft 81d and rotatable therewith a ratchet wheel 100 having regularly spaced recesses 101 formed in the periphery thereof. Also carried by the shaft 81d adjacent to the wheel 100 and rotatable relative to the shaft 81d is a swingable arm 102 the free end of which is connected to the outer end of a piston rod 103 actuated by a vertical pneumatic cylinder C1. The cylinder C1 has its lower end pin connected to a bracket 104 suitably mounted on the front wall of the chamber 13.

A second pneumatic cylinder C2 is longitudinally movably supported on the arm 102 by means of tracks 106 and is provided with a forward projecting pallet detent 107 which is adapted to register with successive recesses 101 formed in the wheel 100. The cylinder C2 is provided with a piston rod 108 having its free end fixed to the outer end of the arm 102, the stroke of the cylinder C2 being sufficient to effect alternatively complete engagement and disengagement between the pallet detent 107 and the respective recesses 101. The cylinder C2 is normally air urged in a direction effecting engagement of a recess 101 by the detent 107.

A pneumatic cylinder C3 is slidably mounted on the side wall of the chamber 13 and is provided at its leading end with a forwardly directed pawl detent 109 adapted to register with a recess 101 formed in the wheel 100. The piston rod 110 of the cylinder C3 is affixed to the side wall of the chamber 13 and is normally air urged so that the detent 109 is in engagement with a respective recess 101 and is withdrawn from engagement therewith upon actuation of the cylinder C3 as will be hereinafter set forth.

A two-way switch S3 has an actuating arm which is disposed in the path of the arm 102 and is engaged by the arm 102 at the terminus of its forward stroke. A pair of suitably supported normally open and normally closed switches S2 and S15 respectively are also located in the path of the arm 102 and are provided with actuating arms which are engaged by the arm 102 at the lowermost terminus of its stroke. The switch S2 is a normally open snap switch which momentarily closes during actuation thereof and remains open during release. The cylinders C1, C2 and C3 are each controlled by four-way solenoid-operated valves V1, V2 and V3 respectively as will be hereinafter set forth.

The mechanism for effecting the feeding of a tray through the opening 29 into the chamber 12, the transfer of trays through the opening 18 from the compartment 21 to the compartment 26 and the discharge of the trays from the chamber 13 through the opening 30 includes longitudinally spaced successive pairs of laterally spaced longitudinally extending endless sprocket chains 112, 113, and 114, respectively carried by corresponding sprocket wheels 116a mounted on transverse shafts 117, 118 and 119 respectively, the trailing shaft 117 being spaced rearwardly of the trailing wall of the chamber 12 a distance greater than the length of a tray and the shaft 119 being located forward of the leading wall of the chamber 13. The leading shaft 117 of the chains 112 and the trailing shaft 118 of the chains 113 carry sprocket wheels which are coupled by a connecting sprocket chain 120. Sprocket wheels 121 are affixed to the trailing shafts 118 and 119 of the chains 113 and 114 and are each coupled by way of sprocket chains 122 to sprocket wheels 123 mounted on shafts 126 located in the lower part of the cabinet. Sprocket wheels 127 are also affixed to the shafts 126 and engage a sprocket chain 128 the ends of which are connected to the respective ends of a piston rod 129 extending through a horizontal pneumatic cylinder C7 and associated with a corresponding piston. The cylinder C7 is controlled by a four-way solenoid-actuated valve V7. A pair of upright legs 130 are mounted at the free ends of the piston rod 129. Located in the path of the respective legs 130 are the normally open switches S7 and S9 respectively.

Each of the chains 112, 113 and 114 carry a tray engaging dog 132. The stroke of the piston C7 and the ratios of the associated sprocket wheels are such that each of the dogs 132 is advanced and retracted upon corresponding actuation of the cylinder C7 so as to engage a tray and advance it through the opening 29 into a position resting on a set of supporting elements 96 and to transfer a tray from the comparement 21 into registry with a set of supporting elements 96 in the compartment 26 and to discharge a tray from the conveyor in the compartment 27 through the discharge opening 30. It should be noted that the upper runs of the sprocket chains 112, 113 and 114 are spaced laterally inwardly from the inner ends of the tray supporting elements 96 and slightly above the upper surfaces of the sets of elements 96 in alignment with the openings 18, 29 and 30 when said elements are in their rest positions.

The arrangement for transferring the trays from the compartments 20 and 26 to the compartments 21 and 27 respectively through the corresponding openings in the partitions 22 and 28 include a retractable track mechanism and a tray shifting mechanism. The retractable track mechanism is located in each of the chambers 12 and 13 and includes a pair of longitudinally extending laterally spaced rocking shafts 133 disposed outside the lower periphery of the upper sprocket wheels 80 and suitably rotatably supported. Mounted on each of the shafts 133 and rotatable therewith are brackets 134 carrying at their free end angle members 135 defining tracks which are of a length slightly less than the distance between the vertical flights of the sprocket chains 82 and 85. Mounted at the ends of each of the shafts 135 adjacent an end wall of the respective chambers 12 and 13 is a lever 136 the free end of which is coupled by means of a connecting rod 137 to a cross-head 138 carried by a piston rod 139. Each of the piston rods 139 is actuated by a pneumatic cylinder C4 and C5 respectively to rock the shafts 133 to bring the tracks 135 into an advanced horizontal coplanar position when the piston rod 139 is in its advanced position, and to retract the tracks 135 out of the path of the tray supporting elements 96 when the piston rod 139 is in its retracted position. The pneumatic cylinders C4 and C5 are mounted on the end walls of the chambers 12 and 13 respectively and a laterally extending arm 140 is carried by each of the cross heads 138. Normally open switches S4 and S5 respectively are disposed in the path of the arms 140 and are actuated to closed position upon the piston rod 139 reaching its advanced position. Associated with the pneumatic cylinders C4 and C5 are solenoid-operated four-way valves V4 and V5 respectively.

In order to shift the trays along the engaging tracks 135 between the successive compartments 20 and 21 and 26 and 27 there are provided two longitudinally spaced pairs of laterally spaced sprocket chains 141 located above the tracks 135 and extending from the trailing ends of the compartments 20 and 26 into the trailing ends of the compartments 21 and 27 respectively. The sprocket chains 141 are carried and advanced by and between sprocket wheels 142 mounted on suitably rotatably supported laterally extending shafts 143a and 143b. Each of the shafts 143b carries a sprocket wheel 144 which is chain coupled to a sprocket 146 affixed to a rotatable stub shaft 147. The stub shafts 147 have affixed thereto sprocket wheels 148 about which extends a sprocket chain 149 the free ends of which are connected to the ends of a piston rod 150 which is reciprocable by a pneumatic cylinder C6 carried on the side wall of the cabinet 10. Depending from each pair of sprocket chains 141 are a pair of laterally spaced tray advancing dogs 152 which extend to a point slightly below the tracks 135. The stroke of the piston rod 150 and the ratios of the various sprockets are such that the dogs 152 traverse a path from a point shortly anterior of the trailing vertical flight of the sprocket chains 82 to a point immediately anterior of the leading vertical flight of the sprocket chains 85. Switch-actuating arms 153a and 153b depend from the free end of the piston rod 150. Normally open switches S6 and S8 are disposed in the paths of the actuating arms 153b and 153a respectively so as to effect a closing of the respective switches S6 and S8 when engaged by corresponding arms 153b and 153a. The cylinder C6 is controlled by a solenoid-operated four-way valve V6.

Figure 7:
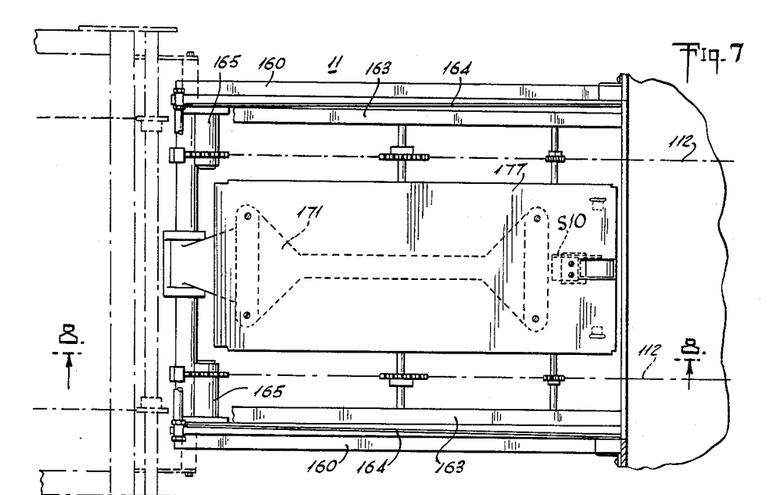
FIGURE 7 is a top plan view partially broken away and partially in section of the tray feed mechanism associated with the improved apparatus.
Figure 8:
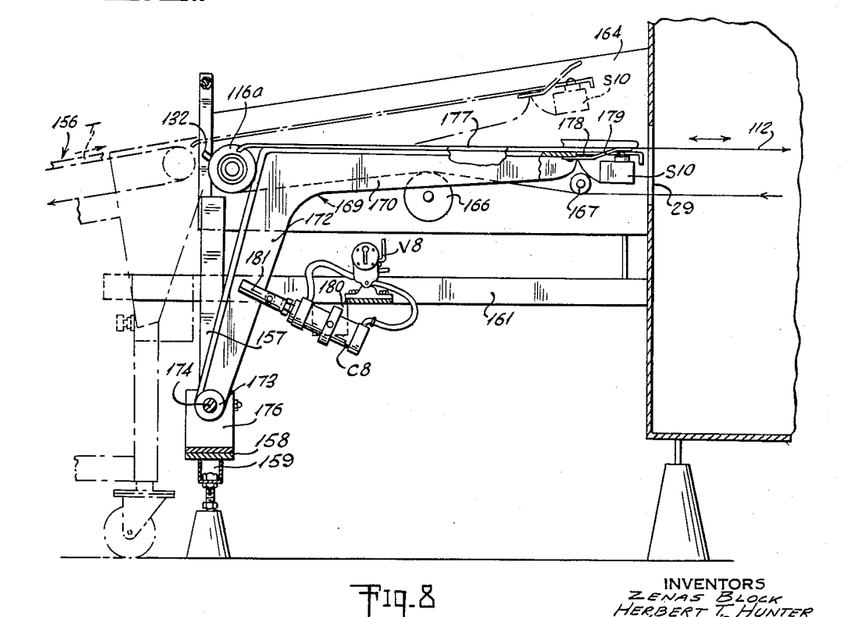
FIGURE 8 is a sectional view taken along line 8—8 in FIGURE 7, the tray support bracket being illustrated in full line in tray delivery position and in broken line in tray receiving position.

The tray feeding device 11 sequentially delivers the individual trays into the cabinet 10 through the feed opening 29 and is disposed between the trailing end wall of the cabinet 10 and a tray transporting forwardly upwardly inclined endless conveyor 156. The tray feeding device 11 includes a frame member comprising a pair of laterally spaced upright legs 157 located rearwardly of the cabinet trailing wall and connected along their bottom by a cross piece 158 from which depends a pair of vertically adjustable foot pieces 159 resting on suitable pedestals. The legs 157 are connected to the trailing wall of the cabinet 10 by upper and lower pairs of horizontal stringers 160 and 161 respectively. The stringers 160 carry along their inner faces a pair of horizontal longitudinally extending angle shaped track members 163 which are in alignment with the cabinet feed opening 29, the bearing surfaces thereof being slightly above the upper surfaces of a set of tray supporting elements 96 in alignment with the feed opening 29 when the sprocket chains 82 and 85 are in rest position.

A pair of substantially vertical longitudinally extending guide plates 164 are located along the length of the tracks 163 adjacent to their outer edges, the upper edges of the guide plates 164 being upwardly forwardly inclined and their inner faces being forwardly and outwardly inclined and downwardly and inwardly inclined. The sprocket chains 112 are at about the level of the tracks 163 and pass around the trailing sprocket wheels 116a carried on stub shafts 165 mounted on the upper stringers 160. The lower runs of the sprocket chains 112 pass over and under the idler sprocket wheels 166 and 167 respectively which are rotatably carried by transversely extending axles supported by and between the stringers 160.

The tray feeding arrangement also includes a rockable bracket 169 having a forwardly extending upper leg 170 having forward and rear coplanar supporting members 171 and a depending leg 172 terminating in a transversely extending bearing member 173. The bearing member 173 rotatably engages an axle 174 supported by and between brackets 176 carried on the cross piece 158. A longitudinally extending flat platform member 177 is mounted on the support members 171 and is disposed between and is of lesser width than the distance between the laterally spaced sprocket chains 112. The legs 170 and 172 of the bracket member 169 form an obtuse angle with each other so that when the leg 172 is in vertical position the platform 177 is substantially coplanar with the conveyor 156 and when the bracket 169 is in its forward position the platform 177 is substantially horizontal and extends to a point adjacent to the feed opening 29.

A rearwardly extending medially located rectangular recess 178 is formed along the forward border of the platform 177. A resilient arm 179 defined by a flat leaf spring has its trailing edge secured to the underface of the platform 177 and extends upwardly and forwardly through the opening 178 to a point above the upper face of the platform 177. A normally open switch S10 is suitably supported below the platform 177 and has an actuating plunger confronting the underface of the resilient arm 179 so that when the free end of the resilient arm 179 is urged to the level of the platform 177 a closing of the switch S10 is effected.

A pneumatic cylinder C8 is pivotally supported for rotation about a horizontal transverse axis by a bracket 180 supported by and between the stringers 161. The piston rod of the pneumatic cylinder C8 is pin-connected to a bracket 181 carried by the bracket leg 172 substantially intermediate the ends thereof. The pneumatic cylinder C8 is controlled by a solenoid-operated four-way valve V8. Disposed in the path of the bracket leg 172 are a pair of switches S11 and S16 which are actuated when the platform 177 reaches its horizontal position. The switch S11 is a normally open snap switch which closes momentarily upon actuation thereof but remains open during release. The switch S16 is a normally open switch urged to closed position upon actuation by the bracket leg 172. It should be noted that the dogs 132 are of such dimensions that they are below the level of the platform 177 when the latter is in its raised position in alignment with the conveyor 156.

The electrical network of the improved apparatus is illustrated in FIGURE 2 of the drawing and includes a step-down transformer T for operating the various solenoid valves V, the primary of the transformer T being connected to a source of alternating current by way of a switch S1. One terminal of the low voltage secondary of the transformer T is grounded and the other terminal is connected by way of a line 200 to a first pole of the switch S10, the first pole of the switch S15, the common contact of the switch S3 and to the normally open contact S13D of a spring-retarded push button switch S13. The switch S13 includes the normally closed contacts S13A and S13B and the normally open contacts S13C and S13D. The contacts S13B and S13C are interconnected. Contacts S13A and S13B are normally closed and are opened upon actuation of the switch S13 as the normally open contacts S13C and S13D are closed. Upon release the switch S13 returns to its normal position. The second pole of the switch S10 is connected to the advance contact of the solenoid valve V8.

It should be noted that the various solenoid valves V are provided with advance contacts and retard contacts and with center taps which are grounded. Upon energization of either of the contacts the valve is thrown to a corresponding position which it retains until the energization of the opposite contact. The second pole of the switch S15 is connected to the arm S14A of a double throw eight pole switch S14 which is provided with ganged double throw arms S14A, S14B, S14C and S14D and with upper poles S14E, S14F and S14G, corresponding to arms S14A, S14B, S14C and lower poles S14H and S14I, corresponding to arms S14A and S14D. The switch pole S14G is connected to a first pole of the switch S11, S14F to switch pole S13A, S14G to the first pole of the switch S16, S14I to a source of alternating current and S14H to a first pole of a timer switch TS the other pole of which is connected by way of a line 201 to the second pole of the switch S11 and to the advance contacts of the valves V2, V4 and V5. It should be noted that the timer switch TS when energized periodically momentarily shorts the contacts thereof to complete the circuit therebetween. The interval between successive closings of the contacts may be adjusted.

The switch arm S14B is connected to the retard contacts of solenoid valves V4, V5, V6 and V7, to a first pole of the switch S7 and to the advance contact of the solenoid valve V3. The switch arm S14C is connected to the line 200 and the switch arm S14D is connected to the timing motor of the switch ST, the other contact of the timing motor being connected to the opposite pole of an alternating voltage source.

The function of the switch S14 is to alternatively effect the operation of the apparatus as timed by the feeding of loaded trays from the conveyor 156 to the platform 177 or to operate the apparatus in periodic innntermittent manner when no trays are delivered to the platform 177. The operation of the apparatus is controlled by the delivery of trays when the arms of the switch S14 are in their uppermost position and is controlled by the timer switch TS when the arms are in their lower position. The switch pole S13B is connected to the retard contact of the solenoid valve V8, the switch S13 functioning to selectively return the platform 177 to tray-receiving position when the occasion should require.

A four-pole double throw switch S12 is provided with arms S12A and S12B and an upper pole S12C corresponding to arm S12B and lower poles S12D and S12E corresponding to the arms S12A and S12B. The switch arm S12A is connected to the retract contact of valve V3 and to a first pole of the switch S2, the switch arm S12B being connected through and in series with the switches S4 and S5 to the second pole of the switch S2 and to the normally closed pole of the switch S3. The switch pole S12C is connected to the advance contact of valve V6, the advance contact of valve V1, the advance contact of the valve V7 and by way of a plug 203 through a normally closed switch S17 to the switch pole S12E.

The switch S12 selectively activates a descreening mechanism following the conditioning apparatus and inserts the switch S17 into the circuit in order to interrupt the cycling of the improved conditioning apparatus when the activated descreening mechanism is not ready to receive the next successive tray from the conditioning apparatus. Such may occur when the descreening mechanism is of the type described in the hereinafter identified copending application Serial No. 537,763. When the switch S12 is in its lower position the descreening mechanism is activated and the normally closed switch S17 is in the circuit and when the switch S12 is in its upper position the switch S17 is shorted from the circuit and the screening mechanism is deactivated. When the descreening mechanism is not ready to receive a tray the switch S17 is open and is closed upon the descreening mehcanism being ready for the recognition of a tray.

The normally open pole of the switch S3 is connected to the retard contact of the valve V2 and to a first pole of the switch S6 and a first pole of the switch S8. The second pole of the switch S6 is connected to the second pole of the switch S7 and the second pole of the switch S8 is connected to the first pole of the switch S9 the second pole of which is connected to the retard contact of the solenoid valve V1. The second contact of the switch S16 is connected through solenoid of a time delay relay 204 to ground, the time delay relay in turn actuating a buzzer 206.

Considering now the mechanical and electrical operation of the improved apparatus as actuated in accordance with the delivery of trays thereto, the arms of switches S12 and S14 are in their upper position and FIGURE 2 illustrates the condition of the apparatus when it is in rest position and ready to receive a loaded tray. A loaded tray T is delivered by the conveyor 156 onto the platform 177, the leading edge of tray T when completely resting on the platform 177 depressing the arm 179 to close the switch S10. Upon closure of the switch S10 the advance contact of the valve V8 is energized thereby causing the piston of the cylinder C8 to retract, rocking the bracket 169 clockwise to a position where the platform 177 is in alignment with the feed opening 29 and a set of tray supporting elements 96. The leg 172 of the bracket 169 closes the switch S11 thereby energizing the line 201 which is connected by way of the closed switch S11, switch S14 and the closed switch S15 to the energized line 200. The energization of the line 201 actuates the advance contacts of the valves V4, V5 and V2 to advance the piston rods of the respective cylinders C4 and C5 to retract the piston C2. The retraction of the piston C2 effects disengagement of the wheel 100 by the detent 107, and the advance of the piston rods 139 of the cylinders C4 and C5 swings the tracks 135 about the respective shafts 133 into a tray-receiving and transfer position. The raising of the piston rods 139 also effects a closing of the switches S4 and S5 by the actuating arms 140 mounted on the piston rods 139 to connect the advance contacts of the solenoid valves V1, V6 and V7 to the energized line 200 by way of the switch S12 and the closed switches S4, S5 and S3.

It should be noted that when the arms of the switch S12 are in their lower position in a manner opposite to that above set forth and the switch S17 is closed the advance contacts of the valves V1, V6 and V7 are connected to the power line through the switches S17, S12, S4, S5 and S3. The energization of the advance contact of the valve V6 advances the piston of the cylinder C6 from its right to its leftmost position as seen in FIGURE 2 motivating the sprocket chains 141 to carry the depending dogs 152 from their retracted to their advanced position to slide the uppermost trays in the compartments 20 and 26 along the tracks 135 into engagement with the aligned sets of tray supporting elements 96 in the successive respective compartments 21 and 27.

The piston rod 129 of the cylinder C7 is advanced from its left to its rightmost position motivating the sprocket chains 112, 113 and 114 and advancing the corresponding dogs 132 to transfer a tray from the platform 177 through a feed opening 29 to an awaiting aligned set of tray supporting elements 96; the lowermost tray in the compartment 21 through the opening 18 into the compartment 26 into engagement with a corresponding set of aligned supporting elements 96 and the lowermost tray in the compartment 27 through the discharge opening 30.

The energization of the advance contact of the valve V1 causes the piston rod to move upwardly swinging the arm 102 counterclockwise an angle corresponding to the distance between successive recesses 101 in the wheel 100. The movement of the pistons of the cylinders C6 and C7 to their advance position effects the opening of the switches S8 and S9 and the closing of the switches S6 and S7 and the advancing of the arm 102 effects the return of the switches S2 and S15 to a normally open position and the opening of the normally closed and the closing of the normally open poles of the switch S3 to deenergize the advance contacts of the solenoid valves V1 to V7. The closing of the normally open contact of the switch S3 effects the energization of the retract contacts of the valves V4, V5, V6, V7 and V8 by way of the closed switches S6 and S7 causing the piston rods of the cylinders C6 and C7 to retract effecting the immediate opening of the switches S6 and S7 and the closing of the switches S8 and S9 when their respective pistons reach the end of their stroke. The conveyors and dogs motivated by the pistons C6 and C7 are returned to their retracted positions and the tracks 134 are retracted by the cylinders C4 and C5. The cylinder C8 is actuated to urge its piston rod forwardly and to swing the bracket 169 counterclockwise and return the platform 177 into alignment with the conveyor 156. The retard contact of the solenoid V2 is likewise energized upon closing of the normally open contact of the switch S3 to bring the detent 107 into engagement with the next successive recess 101 and the wheel 100 and the advance contact of the valve V3 is energized to actuate the cylinder C3 and carry the detent 109 out of engagement with the recess 101 of the wheel 100. Upon closing of the switches S8 and S9 consequent to the full return of the piston rods of the cylinders C6 and C7 the retard contact of the solenoid valve V1 is energized causing the retraction of the piston of the cylinder C1 to swing the arm 102 clockwise carrying with it the wheel 100 to thus advance the conveyor sprocket chains 82 and 85 an increment corresponding to the distance between successive tray supporting elements 96. Upon return of the arm 102 to its fully retracted position the apparatus is in condition for the next successive cycle in the manner above set forth.

In the event that it is desired to advance the trays through the apparatus when no trays are delivered to the platform 177 or when the cabinet is employed without the automatic tray feeding control device, as will be hereinafter set forth, the switch S14 is thrown to its lowermost position which disconnects the switch S11 from the circuit and connects the timer TS. The timer TS delivers regularly spaced pulses to initiate the tray advancing and transfer cycle in the manner identical to the initiating of such cycle upon the momentary closing of the switch S11. Each successive closing of the contacts of the timer TS is equivalent to the closing of the switch S11. If, for some reason, the cylinder C8 does not return the platform 177 to its tray receiving position within the required time the switch S13 may be depressed to thereby energize the retract contact of the solenoid valve V8 and actuate the cylinder C8 to return the platform.

In FIGURES 11 through 14 of the drawing there is illustrated an alternate mechanism for feeding trays into the cabinet 10 through the feed opening 29, the alternative mechanism being employed when the conveyor system is regularly, periodically actuated by the timing switch TS or any other suitable timing device. The alternative tray feeding arrangement includes a rearwardly extending horizontal platform 210 supported in alignment with the feed opening 29, the upper surface of the platform 210 being substantially coplanar with the set of tray supporting elements 96. A pair of longitudinal horizontal slots 211 are formed in the platform 210, the platform being provided with depending flanges 212 along the edge of the slot 211. A longitudinally extending track member 213 of rectangular transverse cross section is disposed between each pair of flanges 212, the upper edge of the track 213 being located below the top face of the platform 210. Riding along the tracks 213 and supported thereby along their upper run are the sprocket chains 112 which travel about corresponding sprocket wheels 116a located rearwardly of the trailing end of the track members 213. Each of the sprocket chains 112 carries a tray engaging dog 214 which is of substantial U-shaped cross section having an upper cross arm 216 and depending flanges 217. The leading edges of the flanges 217 include an upper downwardly rearwardly inclined portion 218 and a lower vertical portion 219 when the cross piece 126 is in horizontal position. The dog 214 straddles a link 220 of the sprocket chain 112 and is rotatably secured thereto by means of a pin 221 which passes through aligned openings formed in the upper rear portion of the flanges 217 and in the sprocket chain links 220, the pin being suitably locked in position.

Figure 12:
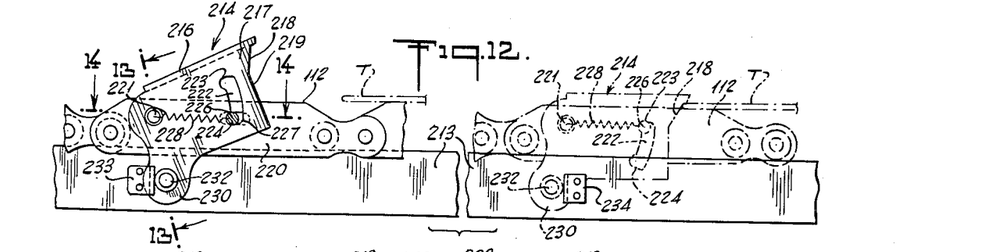
FIGURE 12 is an enlarged, detailed view, partially broken away, of the tray engaging arrangement illustrated in full line in tray engaging position and in broken line in depressed position.
Figure 13:
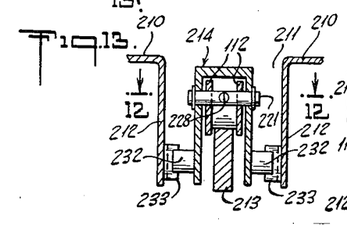
FIGURE 13 is a sectional view taken along line 13—13 in FIGURE 12.
Figure 14:
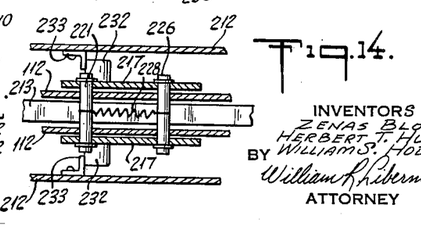
FIGURE 14 is a sectional view taken along line 14—14 in FIGURE 13.

Each of the flanges 217 has an arcuate slot 222 formed therein which is concentric with the pin 221 and which has formed in its trailing edge adjacent its upper and lower ends upper and lower shallow recesses 223 and 224 respectively. A transversely extending pin 226 engages the slots 222 and registers with longitudinally extending slots 227 formed in the links 220. A helical tension spring 228 has its ends engaging the pins 221 and 226 to resiliently urge the pin 226 rearwardly so that the pin 226 will alternatively releasably seat in a recess 223 or 224.

Depending from the lower rear edge of each of the flanges 217 is an ear 230 which carries an outwardly directed roller 232. Each of the platform depending flanges 212 carries an inwardly directed detent 233 adjacent its trailing end and a detent 234 adjacent its leading end, the detents 233 and 234 being in the path of the rollers 232 at the forward and rear termini of the travel of the dogs 214.

Figure 11:
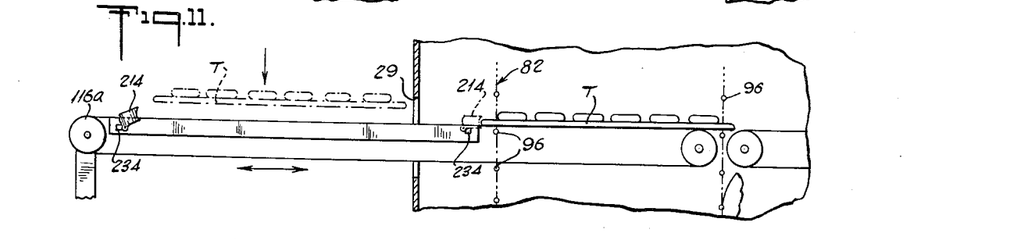
FIGURE 11 is a front elevational view partially in section and partially broken away of another form of tray delivery mechanism which may be employed in association with the present apparatus.

In operation, the sprocket chain 112 is periodically reciprocated in the manner previously set forth when the apparatus is controlled by the timing mechanism TS to carry the dogs 214 between their advanced and retracted position. As the dogs approach their retracted position the detents 233 strike the rollers 232 swinging the dogs 214 about the pins 221 to a raised position. As the dogs 214 are rotated towards their raised position the locking pin 226 is unseated from the recesses 223 and come to rest in the recesses 224. As the dogs are carried to their advanced position the rollers 232 strike the detents 234 to swing the dogs 214 clockwise to their depressed positions.

When a loaded tray is placed on the platform 210 the dogs 214 engage the edge of a tray and carry it through the feed opening 29 into the cabinets 10 onto a set of waiting tray supporting elements 96. In the event that when the tray is placed on the platform the dogs 214 are not in their retracted position but in their advanced position the dogs will be subsequently carried rearwardly beneath the level of the tray and thus not disturb the tray. Moreover, should the dogs be traveling during the disposition of a tray upon the platform 210 the weight of the tray will depress the dogs to their lower position permitting the dogs to complete their journey without any further interference and without movement of the tray.

The novel apparatus described above may be employed in practicing the improved process, particularly as applied to the cooling of freshly fried cakes whether in a glazed or an unglazed condition.

When freshly fried unglazed cakes are treated the air is circulated through the various compartments at a high velocity between approximately 200 feet per minute and 2000 feet per minute, preferably in excess of 250 feet per minute. The temperature of the exhaust or downstream air as sensed by the thermostat 66 and leaving the compartments 26 and 27 by way of the conduit 39 is automatically preferably maintained at approximately room temperature and should be within 5° F. of room temperature. The relative humidity of the exhaust or downstream air leaving the compartments 26 and 27 by way of the conduit 39 should be within 40% of and perferably not more than 30% less and no more than the ambient relative humidity equilibrium of the treated cake and should optimumly be at approximately this equilibrium condition. That is, the relative humidity of the downstream air should be approximately equal to the relative humidity of the ambient atmosphere of the fried cakes in a closed envelope at room temperature. It has been further found that the relative humidity of the downstream air should be between 60% and 85%. The time which the fried cake is subjected to the high velocity air should be sufficient to bring the temperature of the cake to room temperature and reduce the moisture content thereof between ½% and 3%, based on the total weight of the cake.

In effecting the automatic conditioning of the circulated high velocity air, cold water; that is, water at approximately room temperature or below is sprayed into the upstream air when the dry bulb temperature thereof exceeds the present level, preferably room temperature, as aforesaid, and steam is injected into the upstream air when the wet bulb temperature of the downstream air falls below the predetermined level as aforesaid. The wet bulb temperature is set with reference to the dry bulb temperature to achieve the desired relative humidity. It should be noted that the freshly fried uncoated cakes may be initially subjected to a high velocity flow of unconditioned air at room temperature or at an elevated temperature as will be hereinafter set forth.

In employing the improved apparatus in the treatment or freshly glazed doughnuts, unexpected superior results have been achieved by subjecting the freshly glazed doughnuts to a high velocity flow of air; that is, in excess of 200 feet per minute, preferably between 250 and 2000 feet per minute, at a temperature between 115° F. and 125° F., preferably approximately 120° F., for a time of between 4 and 8 minutes, preferably for about 6 minutes. Thereafter, the glazed doughnuts are subjected to the high velocity air at room temperature and relative humidity for from 10 to 25 minutes, for example, approximately 18 minutes or until the doughnuts are at approximately room temperature.

The following illustrations of the present improved process employing the improved apparatus are given merely by way of example.

*Example I*

Loaded trays of plain ring cake doughnuts having a weight of twelve ounces per dozen were delivered directly from the frier by the conveyor 156 to the platform 177 at the rate of three trays per minute. Each of the trays was conveyed through the apparatus in 20 minutes, being located in each of the successive compartments 20, 21, 26 and 27 for five minutes. The room temperature was 79° F. dry bulb, 66° F. wet bulb and the relative humidity was 50%. The crumb temperature of the doughnuts being fed to the apparatus was 195° F.

The resistance heater 68 was deenergized by opening switch 70 and the dry bulb thermostat was set at 79° F. and the wet bulb thermostat 59 at 69° F. so that the downstream air had a temperature of 79° F. (room temperature) and a relative humidity of about 60%. The blowers 34, 36 and 37 were motivated by energizing the corresponding motors, the capacity of the blowers 34 and 37 being 3000 cubic feet per minute and the blower 36 1800 cubic feet per minute and the velocity of the air through the compartment 21 was approximately 1500 feet per minute and through the compartments 22, 26 and 27 averaging approximately 1500 feet per minute. The air flowing through the compartment 21 was drawn from the surrounding atmosphere. The crumb temperature of the emerging doughnuts was 79° F. and the doughnut had lost 2.5% moisture based on the weight of the doughnut. It should be noted that the original moisture content of the doughnut depends on the particular recipe employed but that the optimum moisture loss was found to be 2.5% as aforesaid for the cake type doughnut.

The doughnuts emerging from the apparatus were at an optimum condition for immediate packaging or for the application of the conventional dusting compositions and sugars and subsequent packaging. In the first compartment 21 the high velocity ambient air was employed to accelerate the temperature and moisture losses of the hot doughnuts. It was observed that in the compartment 21 in accordance with the above conditions about two-thirds of the cooling and about one-third of the moisture removal were accomplished. The circulation of the air under closely controlled conditions was effected in compartments 22, 26 and 27.

*Example II*

In the preparation of glazed yeast raised ring doughnuts weighing fifteen ounces per dozen the freshly fried doughnuts are conveyed through enrobing equipment where conventional glaze is applied to the doughnuts, the freshly glazed doughnuts being then deposited on trays which are transported by the conveyor 156 to the feed platform 177. The room conditions were the same as in Example I and the crumb temperature of the doughnut being fed into the cambinet 10 was 180° F. The time of travel of the doughnuts through the cabinet 10 is twenty-four minutes, six minutes in each of the compartments 20, 21, 26 and 27. The resistance heater 68 is energized by closing the switch 70 and the thermostat 71 is adjusted to 120° F. The blowers 34, 36 and 37 are energized. The switches 67 and 60 of the dry and wet bulb thermostats 66 and 59 are opened so that no steam or water vapor is injected and the air circulated through the compartments 21, 26 and 27 is atmospheric air. The velocities of the air through the various compartments are as previously described.

The doughnuts leave the cooler at a crumb temperature of 81° F. and a moisture loss of 0.75 percent based on the weight of the doughnut.

A consequence of the use of high velocity air at the aforesaid elevated temperatures is a more effective evaporation of water from the glaze layer while such glaze layer and the doughnut are still hot. It has been discovered that as a result thereof the case hardening of the glaze layer is obviated. The case hardening of glaze is normally encountered when air at a high velocity is passed over the glaze causing the outer surfaces of the glaze to crystallize before the required moisture loss is achieved from the entire glaze layer. However, by elevating the temperature of the air the unexpected highly desirable result of the elimination of case hardening was accomplished. The temperature of the air in the first compartment 20 should be between 115° F. and 125° F. and the doughnuts should be exposed to this heated circulating air for a period of between 4 and 8 minutes.

*Example III*

In the cooling of freshly prepared Bismark doughnuts weighing fifteen ounces per dozen the time of passage of the doughnuts through the cabinet 10 was twenty-eight minutes, seven minutes in each of the compartments. The room conditions were similar to those in the first and second examples. The dry bulb thermostat 66 was set at 79° F. and the wet bulb thermostat 59 was set at 65° F. The heater 68 was energized and the thermostat 71 adjusted to 110° F. The blowers 34, 36 and 37 were energized. The crumb temperature of the doughnuts entering the cabinet 10 was 160° F. and the crumb temperature of the doughnuts leaving the cabinet were approximately 84° F. The moisture loss was between 0.75 percent and 1.0 percent based on the total weight of the doughnut. It should be noted that the total moisture content of the doughnut before and after cooling depends upon the particular recipe employed in producing the doughnuts. However, it has been discovered that the optimum moisture loss during the cooling operation of the freshly fried doughnuts is between 0.75 percent and 1.0 percent in order to properly condition the doughnuts so that they will retain any dusting compositions applied thereto. This is a consequence of the removal of the water which will readily migrate from the doughnut crumb to the applied dusting composition without adversely effecting the doughnut per se.

The temperature of the high velocity air to which the doughnuts are first subjected should preferably be between 105° F. and 115° F. and the relative humidity of the air during the subsequent cooling operation should be between 50 percent and 85 percent while the temperature of the downstream air should be approximately room temperature and preferably not in excess of 10° F. above room temperature.

The present application is a continuation-in-part of the copending patent application of Herbert T. Hunter filed September 30, 1955, Serial No. 537,763, and a division of copending application Serial No. 685,983, filed September 24, 1957 by Zenas Block, Herbert T. Hunter and William S. Hodges.

While there have been described and illustrated preferred embodiments of the present invention, it is apparent that numerous alterations and omissions may be made without departing from the spirit thereof.

We claim:
1. The improved method of treating warm freshly cooked cakes comprising transporting said cakes along a predetermined path through a treating zone from a feed end to a discharge end of said path, introducing a stream of conditioned high velocity air relatively upstream into said treating zone at a point trailing said path discharge end, exhausting said air relatively downstream at a point in advance of said trailing point whereby to expose said cakes to said stream of conditioned high velocity air, and regulating the temperaturre and humidity of said air upstream to maintain the temperature of said air downstream at within 5° F. of ambient room temperature and the relative humidity thereof between 50% and 85% by injecting a water mist into said upstream air when said downstream air exceeds a predetermined dry bulb temperature and injecting steam into said upstream air when said downstream air falls below a predetermined wet bulb temperature.

2. The improved method in accordance with claim 1, wherein the velocity of said air is between 200 feet and 2000 feet per minute.

3. The improved method in accordance with claim 1, wherein the relative humidity of said downstream air is maintained at substantially the equilibrium ambient relative humidity of said cakes.

4. The improved method in accordance with claim 1, including the step of exposing said cakes to a flow of high velocity air at an elevated temperature between 105° F. and 115° F. prior to their being exposed to said conditioned air.

5. The improved method in accordance with claim 1, wherein said cakes are exposed to said conditioned air for a time sufficient to reduce the temperature of said cakes to within 10° F. of room temperature and to reduce the moisture content thereof between ½% and 3%, based on the weight of the cake.

6. The method of treating freshly glazed cakes according to claim 1, including the step of initially exposing said cakes to a stream of high velocity air at an elevated temperature of between 115° F. and 125° F.

7. The improved method in accordance with claim 6, wherein said cakes are exposed to said stream of air for a time sufficient to reduce the moisture content thereof approximately 0.75% based on the weight of said cakes.

References Cited in the file of this patent
UNITED STATES PATENTS

| | | |
|---|---|---|
| 2,101,651 | Reece | Dec. 7, 1937 |
| 2,257,487 | Tenney | Sept. 30, 1941 |
| 2,550,526 | Braun | Apr. 24, 1951 |
| 2,783,545 | Booth | Mar. 5, 1957 |
| 2,897,772 | Hunter | Aug. 4, 1959 |